(12) United States Patent
Tsurumaru et al.

(10) Patent No.: US 10,044,200 B2
(45) Date of Patent: Aug. 7, 2018

(54) STORAGE BATTERY SYSTEM

(71) Applicant: TOSHIBA MITSUBISHI-ELECTRIC INDUSTRIAL SYSTEMS CORPORATION, Chuo-ku (JP)

(72) Inventors: Daisuke Tsurumaru, Tokyo (JP); Masato Hanada, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 211 days.

(21) Appl. No.: 14/914,195

(22) PCT Filed: Sep. 19, 2013

(86) PCT No.: PCT/JP2013/075345
§ 371 (c)(1),
(2) Date: Feb. 24, 2016

(87) PCT Pub. No.: WO2015/040724
PCT Pub. Date: Mar. 26, 2015

(65) Prior Publication Data
US 2016/0211681 A1 Jul. 21, 2016

(51) Int. Cl.
*H02J 7/00* (2006.01)
*H02J 3/32* (2006.01)
*H02J 7/02* (2016.01)

(52) U.S. Cl.
CPC ............. *H02J 7/0026* (2013.01); *H02J 3/32* (2013.01); *H02J 7/0021* (2013.01);
(Continued)

(58) Field of Classification Search
CPC ....................................................... H02J 7/00
(Continued)

(56) References Cited

U.S. PATENT DOCUMENTS

2010/0280697 A1  11/2010  Yanagisawa et al.
2013/0082641 A1*  4/2013  Nishibayashi ............ H02J 3/32
                                                               320/106
(Continued)

FOREIGN PATENT DOCUMENTS

JP  2001-224142 A  8/2001
JP  2003-169421 A  6/2003
(Continued)

OTHER PUBLICATIONS

English translation of the International Preliminary Report on Patentability and Written Opinion dated Mar. 31, 2016 in PCT/JP2013/075345.
(Continued)

*Primary Examiner* — Mohammed Alam
(74) *Attorney, Agent, or Firm* — Oblon, McClelland, Maier & Neustadt, L.L.P.

(57) ABSTRACT

A storage battery system connected to a power system includes: a storage battery; a BMU which monitors a state of the storage battery; a PCS which converts AC power of the power system into DC power to charge the storage battery with the DC power and converts DC power of the storage battery into AC power to discharge the AC power to the power system; and a control device. The control device receives a charge/discharge request from an EMS and storage battery information supplied from the BMU and controls the PCS based on the charge/discharge request and the storage battery information. The control device includes a charge/discharge command unit which calculates chargeable/dischargeable electric power based on the storage battery information and determines a charge/discharge command to the PCS based on the charge/discharge request by using the chargeable/dischargeable electric power as a constraint condition.

12 Claims, 6 Drawing Sheets

(52) U.S. Cl.
CPC ............ *H02J 7/0031* (2013.01); *H02J 7/027* (2013.01); *H02J 2007/004* (2013.01); *H02J 2007/0037* (2013.01)

(58) Field of Classification Search
USPC ........................................................ 320/112
See application file for complete search history.

(56) References Cited

U.S. PATENT DOCUMENTS

| | | | | |
|---|---|---|---|---|
| 2016/0204629 A1* | 7/2016 | Tsuramaru | ................ | H02J 3/32 320/118 |
| 2016/0211681 A1* | 7/2016 | Tsuramaru | ................ | H02J 3/32 |
| 2016/0211684 A1* | 7/2016 | Tsuramaru | ............... | H02H 7/18 |

FOREIGN PATENT DOCUMENTS

| JP | 2012-75243 A | 4/2012 |
|---|---|---|
| JP | 2012-175864 A | 9/2012 |
| JP | 2013-27210 A | 2/2013 |
| JP | 2013-74636 A | 4/2013 |
| JP | 2013-169068 A | 8/2013 |
| JP | 2013-172567 A | 9/2013 |
| WO | WO 2009/084673 A1 | 7/2009 |
| WO | WO 2013/038483 A1 | 3/2013 |

OTHER PUBLICATIONS

Chinese Office Action dated Jul. 31, 2017 in Patent Application No. 201380079661.1 (with English Translation).
International Search Report dated Dec. 17, 2013 in PCT/JP2013/075345 filed on Sep. 19, 2013.
Office Action dated May 9, 2017 in Japanese Patent Application No. 2015-537510 with unedited computer generated English translation.
Japanese Office Action dated Jan. 9, 2018 in Japanese Patent Application No. 2015-537510 (with unedited computer generated English translation), 11 pages.

* cited by examiner

STORAGE BATTERY SYSTEM

TECHNICAL FIELD

The present invention relates to a storage battery system connected to a power system.

BACKGROUND ART

A power system is constructed by connecting a power generation facility and a load facility through a power transmission and distribution facility. There are power systems of various scales, ranging from large-scale systems that connect a plurality of large-scale power plants with a large number of plants, commercial establishments and households to small-scale systems constructed in specific facilities. The power systems of all the scales include an energy management system (EMS) that manages electric power supply/demand in the entire power system. The EMS balances electric power supply from the power generation facilities and electric power demand from the load facilities.

A storage battery system is connected to the power system as described above to be used as one means for balancing electric power supply/demand. Although a large amount of electric power was once thought hard to store, mass storage batteries like lithium ion batteries and sodium sulfur batteries, which are now in practical use, make it possible to store a large amount of electric power. By connecting the storage battery system including such storage batteries to the electric power system, it becomes possible to adopt such an operation as to charge the storage batteries with electric power excessively generated when electric power supply exceeds electric power demand and to discharge electric power from the storage batteries to compensate shortage of electric power caused when electric power demand exceeds electric power supply.

One adequate application example of such a storage battery system is a combination of the storage battery system with a power generation facility using energy of nature, such as sunlight and wind force. The power generation facilities using the energy of nature are widely being introduced in response to increased interest in energy issues or environmental issues of these days. However, the power generation facilities using the energy of nature have a disadvantage that natural factors, such as seasons and weather, tend to affect electric power to be generated and hinder stable supply of electric power. The storage battery system can make up for the disadvantage, so that stable electric power supply can be achieved by combining the storage battery system with the power generation facilities using the energy of nature.

When the storage battery system is connected to the power system, the operation of the storage battery system is managed by the above-mentioned EMS. The storage battery system includes a power conditioning system (PCS) connected to the storage battery. The PCS has a function of converting AC power of the power system into DC power and charging the storage battery with the DC power, and a function of converting DC power of the storage battery into AC power and discharging the AC power to the power system. When a charge/discharge request is supplied from the EMS to the PCS, the PCS operates in response to the charge/discharge request. As a result, charge of the storage battery with electric power from the power system or discharge of electric power from the storage battery to the power system is achieved.

The applicant of the present invention recognizes the following literature as related art of the present invention.

FIG. 9 in Patent Literature 1 illustrates one example of a storage battery system connected to the power system.

CITATION LIST

Patent Literature

Patent Literature 1: Japanese Patent Laid-Open No. 2013-27210
Patent Literature 2: Japanese Patent Laid-Open No. 2012-75243

SUMMARY OF INVENTION

Technical Problem

The charge/discharge request supplied from the EMS to the PCS is determined so as to balance electric power supply and demand in the entire power system. However, the determination is not necessarily adequate for the storage battery. Since the EMS executes a huge amount of arithmetic calculation, it is difficult for the EMS to constantly grasp the state of the storage battery which is a recipient of the request and to perform finely-tuned control corresponding to the state. When the storage battery system has a large capacity in particular, the storage battery is constituted of a large number of cells. In a specific example, the storage battery is constituted of hundreds of cells to tens of thousands of cells. Accordingly, it is quite difficult to constantly grasp the states of all these cells. As a result, when the EMS manages individual storage batteries, the EMS needs a long cycle for controlling the storage battery system to cope with the ever-changing states of the storage batteries. As a result, the charge/discharge request supplied from the EMS fails to be a proper request corresponding to the states of the storage batteries. Depending on the relation between the charge/discharge request and the states of the storage batteries, not only the storage batteries may insufficiently be used, but also the storage batteries may be overused to the extent that the performance and lives of the storage batteries are affected.

The present invention has been made in view of the above-stated problem, and it is therefore an object of the present invention to provide a storage battery system capable of maximizing the performance of a storage battery without causing overuse of the storage battery.

Solution to Problem

In order to accomplish the above object, a storage battery system according to the present invention is configured as described below.

The storage battery system according to the present invention is connected to a power system and is configured to operate based on a charge/discharge request from an energy management system that manages electric power supply/demand of the power system. There is no limitation on the scale and configuration of the power system to be connected to the storage battery system according to the present invention.

The storage battery system according to the present invention includes a storage battery, a battery management unit, a power conditioning system, and a control device. The storage battery may be constituted of a single storage battery cell, or may be constituted as an assembly of a plurality of storage battery cells. As for the type of storage battery, a mass storage battery such as a lithium ion battery, a sodium sulfur battery, and a nickel-hydrogen battery is preferable.

The battery management unit is configured to monitor the state of the storage battery. The battery management unit monitors the state quantity of monitoring items such as current, voltage, and temperature. As for the voltage, when the storage battery is constituted of a plurality of cells, the voltage of each cell is preferably monitored. The battery management unit measures the state quantity of the monitoring items with sensors on a constant basis or at a specified cycle, and outputs some or all of the obtained data to the outside as storage battery information.

The power conditioning system is configured to connect the storage battery to the power system. The power conditioning system has a function of converting AC power of the power system into DC power and charging the storage battery with the DC power and a function of converting DC power of the storage battery into AC power and discharging the AC power to the power system. The power conditioning system is also called a power conditioner, which regulates the amount of electric power for charging the storage battery and the amount of electric power discharged from the storage battery.

The control device is a device interposed between the energy management system and the power conditioning system. The control device receives the charge/discharge request supplied from the energy management system to the storage battery system. The control device is configured to receive, together with the charge/discharge request, the storage battery information supplied from the battery management unit and to control the power conditioning system based on the charge/discharge request and the storage battery information. The control device includes a charge/discharge command unit. The charge/discharge command unit is configured to calculate chargeable/dischargeable electric power based on the storage battery information, and to determine a charge/discharge command to the power conditioning system based on the charge/discharge request by using the chargeable/dischargeable electric power as a constraint condition.

The chargeable/dischargeable electric power may be calculated based on the voltage of the storage battery. The voltage of the storage battery is included in the storage battery information supplied from the storage battery management unit. Of course, it is possible to refer to information other than the voltage information in calculation of the chargeable/dischargeable electric power. When the storage battery includes a plurality of storage battery modules connected in parallel and each of the plurality of storage battery modules includes a plurality of storage battery cells connected in series, the chargeable/dischargeable electric power may be calculated based on the voltage of the storage battery and the number of storage battery modules arranged in parallel. The charge/discharge command unit may be configured to determine the charge/discharge command so as to maximize the charge/discharge electric power of the storage battery.

The control device may be configured to control a plurality of PCS groups. The PCS group is a group including one power conditioning system, one or more storage batteries, and one or more battery management units. One control device is assigned to the plurality of PCS groups. In this case, a charge/discharge request supplied from the energy management system is a request to the entire plurality of PCS groups. The control device controls the entire plurality of PCS groups based on the charge/discharge request from the energy management system. In such a system configuration, the charge/discharge command unit of the control device may be configured to calculate chargeable/dischargeable electric power for each of the PCS groups and to determine the charge/discharge command for each of the PCS groups in accordance with the chargeable/dischargeable electric power. The charge/discharge command unit may be configured to adjust the charge/discharge command among the plurality of PCS groups so that charge/discharge electric power of the entire plurality of PCS groups meets the charge/discharge request. The charge/discharge command unit may further be configured to calculate a SOC (State of Charge) for each of the PCS groups and to determine the charge/discharge command for each of the PCS groups so that the SOCs of the PCS groups become uniform among them.

In a preferable aspect of the storage battery system according to the present invention, the control device may further include an overdischarge prevention unit. The overdischarge prevention unit is configured to automatically output a charge command to the power conditioning system regardless of the charge/discharge request supplied from the energy management system to prevent the storage battery from reaching an overdischarging state, when the storage battery is close to the overdischarging state. Whether the storage battery is close to the overdischarging state may be determined based on the voltage of the storage battery for example. The overdischarge prevention unit may be configured to compare the voltage of the storage battery with a specified lower limit voltage and to detect that the storage battery is close to the overdischarging state when the voltage of the storage battery is equal to or below the lower limit voltage. When the storage battery includes a plurality of storage battery cells, the overdischarge prevention unit may be configured to compare a voltage of each of the storage battery cells with a specified lower limit cell voltage and to detect that the storage battery is close to the overdischarging state when the voltage of any one of the storage battery cells is equal to or below the lower limit cell voltage.

In another preferable aspect of the storage battery system according to the present invention, the control device may further include an interlock processing unit. The interlock processing unit is configured to perform interlock processing upon detection of abnormality of the storage battery system, the interlock processing corresponding to a content of the detected abnormality. The abnormality of the storage battery system is detectable, for example, from the storage battery information supplied from the battery management unit. In detection of the abnormality of the storage battery system, it is, of course, possible to refer to information other than the storage battery information, such as information from the power conditioning system.

Advantageous Effects of Invention

The storage battery system according to the present invention operates the power conditioning system not in faithful accordance with a charge/discharge request issued by the energy management system but in accordance with a charge/discharge command determined by the control device. When the control device determines the charge/discharge command, the control device refers not only to the charge/discharge request issued by the energy management system but also to the storage battery information supplied from the battery management unit. This makes it possible to give the power conditioning system an instruction corresponding to the state of the storage battery. Accordingly, the storage battery system according to the present invention can maximize the performance of the storage battery without causing overuse of the storage battery.

DESCRIPTION OF EMBODIMENT

Hereinafter, an embodiment of the present invention will be described in detail with reference to the drawings. It is to be noted that like component members are designated by like reference signs to omit redundant description.

First Embodiment

[Overall Configuration of First Embodiment]

Figure 1:
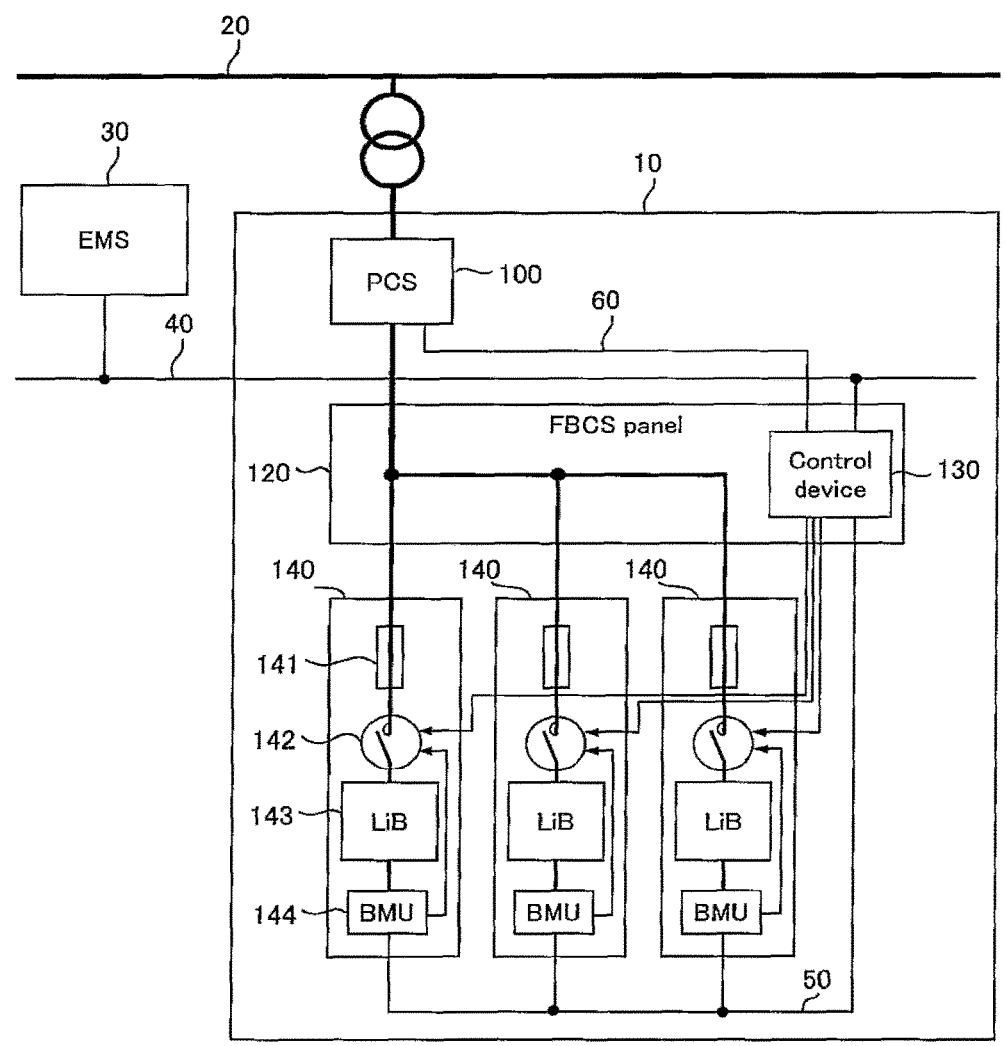
FIG. 1 is a conceptual block diagram for describing the configuration of a system according to a first embodiment of the present invention.

FIG. 1 is a conceptual block diagram for describing the system configuration according to a first embodiment of the present invention. A storage battery system 10 illustrated in FIG. 1 is connected to a power transmission facility 20 of a power system. The power system includes, in addition to the power transmission facility 20, a power generation facility (illustration omitted) connected to the power transmission facility 20, and a load facility (illustration omitted) connected to the power transmission facility 20. The storage battery system 10 is connected to an energy management system (hereinafter referred to as EMS) 30 present in the distant through a computer network 40. The EMS 30 manages electric power supply/demand of the power system, such as the power generation amount of the power generation facility, the charge/discharge amount of the storage battery system 10, and the power reception amount of the load facility.

The storage battery system 10 includes a power conditioning system (hereinafter referred to as PCS) 100, a front battery control station panel (hereinafter referred to as FBCS panel) 120, and storage battery panels 140. In the storage battery system 10, one PCS 100 is connected to one FBCS panel 120, and the one FBCS panel 120 is connected a plurality of storage battery panels 140 in parallel. Although three rows of storage battery panels 140 are provided in FIG. 1, this configuration is merely an example. The number of the storage battery panels 140 arranged in parallel is determined based on the specification of the PCS 100. Therefore, the number of the row of the storage battery panel 140 may be only one.

(Storage Battery Panel)

The storage battery panel 140 includes a fuse 141, a contactor 142, a storage battery module 143, and a battery management unit (hereinafter referred to as BMU 144). The storage battery module 143 is a module constituted of a plurality of cells connected in series. Each cell is a lithium ion battery (LiB). The storage battery module 143 is connected to the FBCS panel 120 via the contactor 142 and the fuse 141 and through a power transmission line. The storage battery module 143 is also connected to the BMU 144 through a signal line. The BMU 144 is connected to the control device 130 on the FBCS panel 120 through a computer network 50, and to the contactor 142 through the signal line.

The BMU 144 monitors the state of the storage battery module 143. Specifically, the BMU 144 includes a current sensor, a voltage sensor, and a temperature sensor as means for measuring the state quantities of the storage battery module 143. The current sensor measures current passing through the storage battery module 143. The voltage sensor measures the voltage of each cell. The temperature sensor then measures the temperature of the storage battery module 143. The storage battery module 143 is constantly monitored by the BMU 144. However, the constant monitoring described in the present embodiment is a concept including not only the operation of taking in continuous signals without an intermission from the sensors but also the operation of taking in the signals of the sensors at a specified short cycle. The BMU 144 transmits to the control device 130 storage battery information including the information obtained by measurement performed by each sensor.

The contactor 142 is disposed between the fuse 141 and the storage battery module 143. Upon reception of an ON signal, a point of contact of the contactor 142 is set to ON and so the contactor 142 is turned on. Upon reception of an OFF signal, the point of contact is set to OFF and so the contactor 142 is turned off. For example, the ON signal is a current of more than a specified value [A], and the OFF signal is a current of less than the specified value [A]. When the contactor 142 is turned on, the PCS 100 and the storage battery module 143 are electrically connected, and when the contactor 142 is turned off, the PCS 100 and the storage battery module 143 are electrically disconnected.

(FBCS Panel)

The FBCS panel 120 is connected to the storage battery panels 140 and the PCS 100. Specifically, the storage battery panels 140 are each connected to the FBCS panel 120 through individual power transmission lines. The individual power transmission lines converge inside the FBCS panel and are connected to a thicker power transmission line. The converged power transmission line is connected to the PCS 100. The FBCS panel 120 also includes the control device 130. The control device 130 includes memories including a ROM and a RAM for example, an input/output interface for inputting and outputting a variety of information, and a processor that can execute various arithmetic processes based on the variety of information. The control device 130 is connected to the EMS 30 through the computer network 40, to the BMU 144 through the computer network 50, and to the PCS 100 through a computer network 60. The control device 130 is connected to the contactor 142 through the signal line.

The control device 130 plays the role of a commander that issues a charge/discharge command to the PCS 100. In one example, the control device 130 receives a charge/discharge request transmitted from the EMS 30 and storage battery information transmitted from the BMU 144. The charge/discharge request includes a request with respect to active power and reactive power charged and discharged by the PCS 100. The charge/discharge request includes a specific request numerically indicating a specific electric power amount, and an abstract request requesting maximum charge/discharge power. The control device 130 determines a charge/discharge command (equivalent to a charge/discharge amount [kW]) to be issued to the PCS 100 based on the charge/discharge request and the storage battery information, and transmits the command to the PCS 100. The control device 130 also includes functions such as a function of safely controlling the performance and life of the storage battery module 143 to the maximum, a function of outputting a trip signal to the PCS 100, and a function of turning on and off the contactor 142.

(PCS)

The PCS 100 is connected to the power transmission facility 20 via a transformer and through the power transmission line. The PCS 100 has a charging function which converts AC power of the power system into DC power and charges the storage battery module 143 with the DC power, and a discharging function which converts DC power of the storage battery module 143 into AC power and discharges the AC power to the power system. The amount of electric power to charge the storage battery module 143 and the amount of electric power discharged from the storage battery module 143 are adjusted by the PCS 100. Regulation of the charge/discharge electric power amount by the PCS 100 is performed in accordance with the charge/discharge instruction supplied from the control device 130. The PCS 100 includes a current sensor and a voltage sensor, and the PCS 100 adjusts the charge/discharge electric power amount with reference to the output values of these sensors.

[Characteristic Configuration of First Embodiment]

Figure 2:
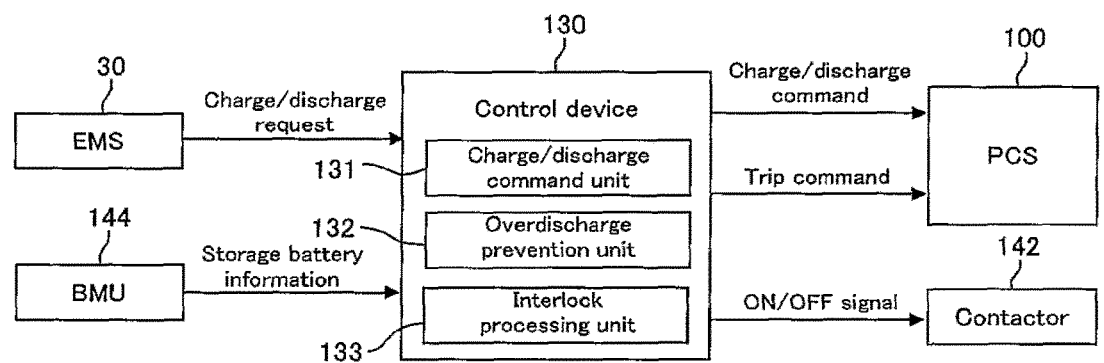
FIG. 2 is a block diagram of the system according to the first embodiment of the present invention.

FIG. 2 is a block diagram of the system according to the first embodiment of the present invention. In FIG. 2, a block representing the control device 130 contains blocks representing some of various functions included in the control device 130. An arithmetic resource is assigned to each of these blocks. Programs corresponding to the respective blocks are prepared for the control device 130, and these programs are executed by the processor, so that the functions of the respective blocks are implemented in the control device 130.

(Charge/Discharge Command Function)

The control device 130 has a charge/discharge command function, which is implemented by a charge/discharge command unit 131. The control device 130 receives a charge/discharge request from the EMS 30, and receives storage battery information from the BMU 144. The charge/discharge command unit 131 determines a charge/discharge command based on the charge/discharge request and the storage battery information, and transmits the charge/discharge command to the PCS 100.

Figure 3:
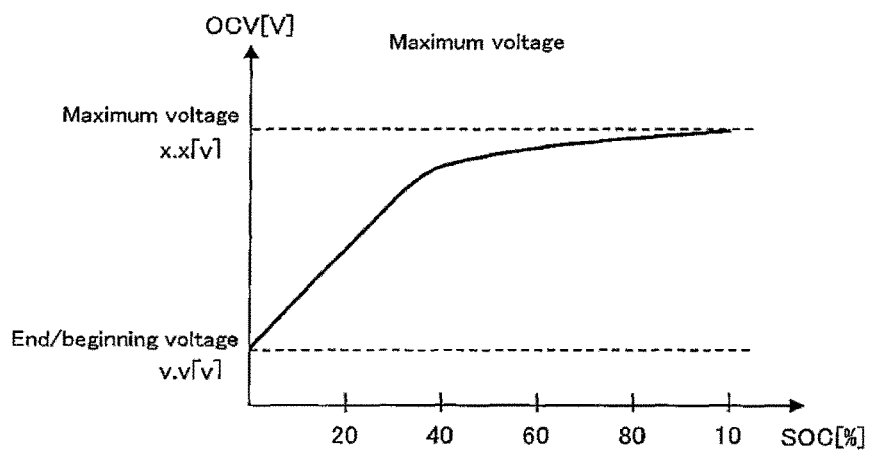
FIG. 3 illustrates the relation between voltage of a storage battery and a SOC.

Specifically, the charge/discharge command unit 131 calculates chargeable/dischargeable electric power based on the voltage of the storage battery module 143 included in the storage battery information. The voltage as used in the present embodiment refers to a voltage across the storage battery module 143. FIG. 3 is a graph view illustrating the relation between an OCV (open circuit voltage) of a lithium ion battery and a SOC. In the present embodiment, the SOC refers to a rate of charge relative to its full charge value. According to the graph view, the lithium ion battery has a characteristics of being higher in voltage when the battery is closer to full charge and being lower in voltage when it is closer to empty. By using the voltage-SOC characteristics, the SOC can be calculated from a measurement value of the voltage, and the chargeable/dischargeable electric power can be calculated from the SOC. It is to be noted that the chargeable/dischargeable electric power calculated by the charge/discharge command unit 131 refers to a sum of the chargeable/dischargeable electric power of all the storage battery modules 143 connected to the PCS 100. This is calculable based on the voltage of the storage battery module 143 and the number of the storage battery modules 143 connected in parallel.

The charge/discharge command unit 131 determines a charge/discharge command to the PCS 100 based on the charge/discharge request from the EMS 30 by using the chargeable/dischargeable electric power as a constraint condition. Specifically, in the case where the charge/discharge request is a specific request that specifically specifies a charge electric power amount, the requested charge electric power amount is determined as a charge/discharge command (charge command) if the requested charge electric power amount is equal to or less than chargeable electric power. If the requested charge electric power amount is larger than chargeable electric power, the chargeable electric power is determined as a charge/discharge command (charge command). In the case where the charge/discharge request is a specific request that specifically specifies a discharge electric power amount, the requested discharge electric power amount is determined as a charge/discharge command (discharge command) if the requested discharge electric power amount is equal to or less than dischargeable electric power. If the requested discharge electric power amount is larger than dischargeable electric power, the dischargeable electric power is determined as a charge/discharge command (discharge command). In the case where the charge/discharge request is an abstract request requesting maximum charge, chargeable electric power is determined as a charge/discharge command (charge command). In the case where maximum electric discharge is requested, dischargeable electric power is determined as a charge/discharge command (discharge command). Although the chargeable/dischargeable electric power as a constraint condition is preferably satisfied in determination of the charge/discharge command, the chargeable/dischargeable electric power is not an absolute condition. Therefore, the charge/discharge command to the PCS 100 is allowed to temporarily exceed the chargeable/dischargeable electric power.

(Overdischarge Prevention Function)

The control device 130 has an overdischarge prevention function, which is implemented by an overdischarge prevention unit 132. The overdischarge prevention unit 132 automatically outputs a charge command to the PCS 100 regardless of the charge/discharge request from the EMS 30 to prevent the storage battery from reaching an overdischarging state, when the storage battery is close to the overdischarging state. The storage battery as used in the present embodiment refers to all of the storage battery modules 143 connected in parallel, and the storage battery being close to the overdischarging state refers to the situation in which at least one of the cells constituting the storage battery module 143 is close to the overdischarging state. The storage battery information supplied from the BMU 144 includes the voltage of each of the cells. The overdischarge prevention unit 132 compares the voltage of each of the cells with a specified lower limit cell voltage and detects that the storage battery is close to the overdischarging state by detecting the presence of any overdischarged cell whose voltage is equal to or below the lower limit cell voltage. The overdischarge prevention unit 132 outputs a charge command to the PCS 100 until the voltage of the overdischarge cell increases to be higher than the lower limit cell voltage.

The charge command output by the overdischarge prevention unit 132 in this case overrides the charge/discharge command determined in the charge/discharge command unit 131 based on the charge/discharge request from the EMS 30.
(Interlock Function)

The control device 130 also has an interlock function, which is implemented by the interlock processing unit 133. Interlocking of the storage battery module 143 is performed also by the BMU 144 when the BMU 144 detects overdischarge, overcharge, abnormal temperature, and the like. However, by the time when such abnormality occurs, the storage battery is already in a considerably overloaded state. Accordingly, in the system of the present embodiment, the PCS 100 and the contactor 142 are controlled by a software interlock mechanism before the BMU 144 interlocks the module 143. The interlock processing unit 133 performs interlock processing upon detection of abnormality of the storage battery system 10, the interlock processing corresponding to a content of the detected abnormality. Specifically, the interlock processing refers to the processing of outputting a trip signal to the PCS 100 and/or turning on the contactor 142. In order to execute the interlock processing before the BMU 144 performs the interlock processing, interlock threshold values, such as current, voltage, and temperature, are set lower than the threshold values set by the BMU 144.

(Flow Chart)

Figure 4:
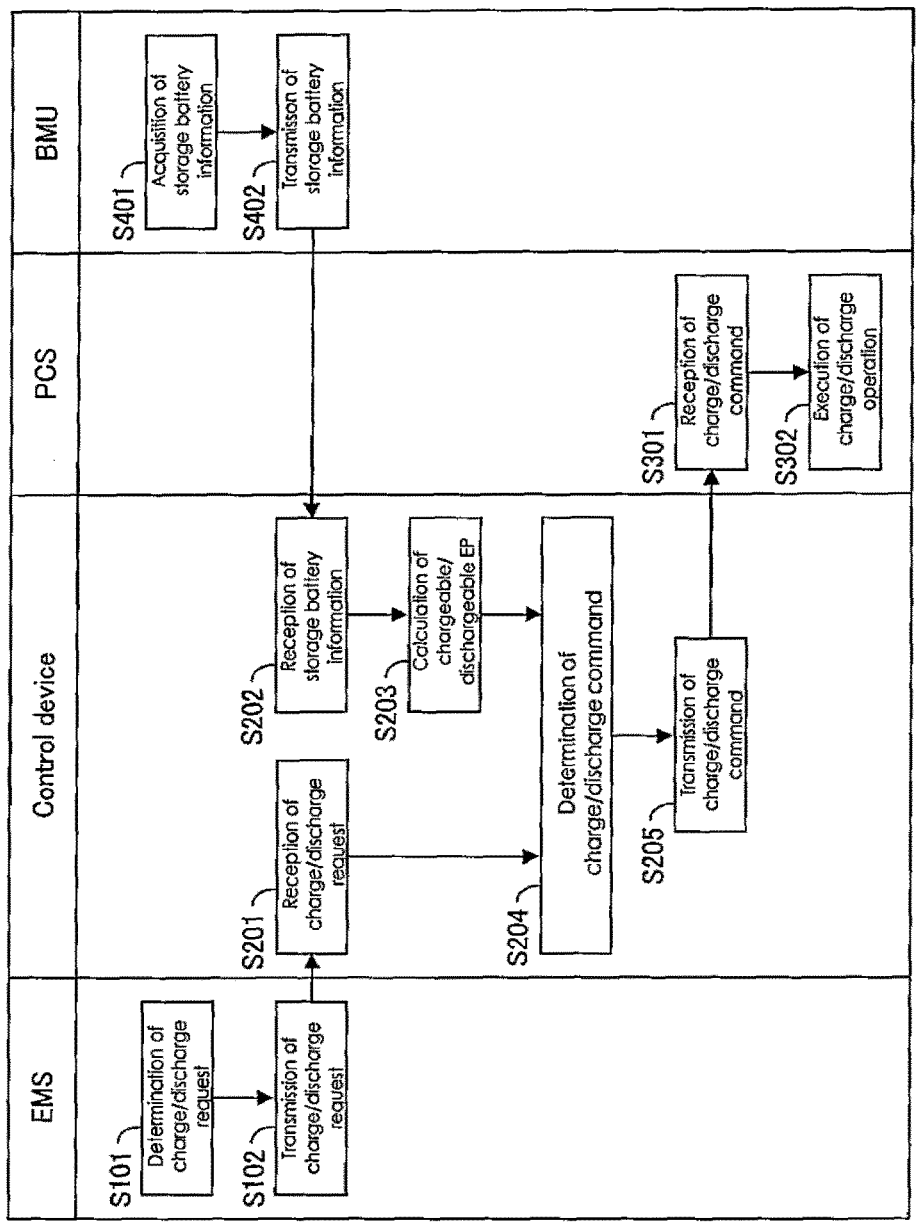
FIG. 4 is a flow chart of a control routine executed by the storage battery system in the first embodiment of the present invention.

FIG. 4 is a flow chart of a control routine executed by the storage battery system 10 to implement charge/discharge control based on the charge/discharge request from the EMS 30. Processing of the control device 130 illustrated in this flow chart is implemented by the function of the charge/discharge command unit 131. The memory of the control device 130 stores programs for executing the processing of the flow chart illustrated in FIG. 4. When the processor of the control device 130 reads and executes the programs, the processing illustrated in FIG. 4 is implemented.

In the routine illustrated in FIG. 4, the EMS 30 first determines the charge/discharge request to the storage battery system 10 so as to balance electric power demand and supply in the power system (step S101). In this case, the EMS 30 may determine the charge/discharge request without consideration of the state of the storage battery system 10, or may determine the charge/discharge request in consideration of the state of the storage battery system 10. However, in the latter case, the EMS 30 needs a long cycle for grasping the state of the storage battery system 10 in relation to the amount of arithmetic operation that the EMS 30 bears. Accordingly, the charge/discharge request determined by the EMS 30 is not necessarily a proper request corresponding to the state of the storage batteries included in the storage battery system 10. The EMS 30 transmits the determined charge/discharge request to the control device 130 (step S102).

Meanwhile, the BMU 144 first acquires storage battery information on the constant basis by using the various sensors described before (step S401). The storage battery information includes the current passing through the storage battery module 143, the voltage of each cell, and the temperature of the storage battery module 143. Then, the BMU 144 transmits the acquired storage battery information to the control device 130 (step S402).

The control device 130 receives the charge/discharge request transmitted from the EMS 30 (step S201). The control device 130 also receives the storage battery information transmitted from the BMU 144 (step S202). The control device 130 calculates chargeable/dischargeable electric power based on the storage battery information received in step S202 (step S203). The chargeable/dischargeable electric power is re-calculated in the control device 130 whenever the storage battery information is acquired in step S401 and transmitted from the BMU 144 to the control device 130.

The control device 130 determines the charge/discharge command to the PCS 100 based on the charge/discharge request received in step S201 by using the chargeable/dischargeable electric power calculated in step S203 as a constraint condition (step S204). The method for determining the charge/discharge command to be executed in step S204 is as stated in the description of the charge/discharge command function. Then, the control device 130 transmits the charge/discharge command to the PCS 100 (step S205).

The PCS 100 receives the charge/discharge command transmitted from the control device 130 (step S301). The PCS 100 executes charge/discharge operation in accordance with the charge/discharge command (step S302).

As described in the foregoing, the storage battery system 10 of the present embodiment does not operate the PCS 100 as directed by the charge/discharge request determined by the EMS 30. The storage battery system 10 of the present embodiment operates the PCS 100 in accordance with the charge/discharge command determined by the control device 130. When the control device 130 determines the charge/discharge command, the control device 130 refers not only to the charge/discharge request supplied from the EMS 30 but also to the storage battery information supplied from the BMU 144, and uses the chargeable/dischargeable electric power calculated based on the storage battery information as a constraint condition. Since the chargeable/dischargeable electric power is re-calculated whenever the storage battery information is acquired, the charge/discharge command based on the latest chargeable/dischargeable electric power is constantly given to the PCS 100. Accordingly, the storage battery system 10 in the present embodiment can maximize the performance of the storage battery without causing overuse of the storage battery.

Second Embodiment

[Overall Configuration of Second Embodiment]

Figure 5:
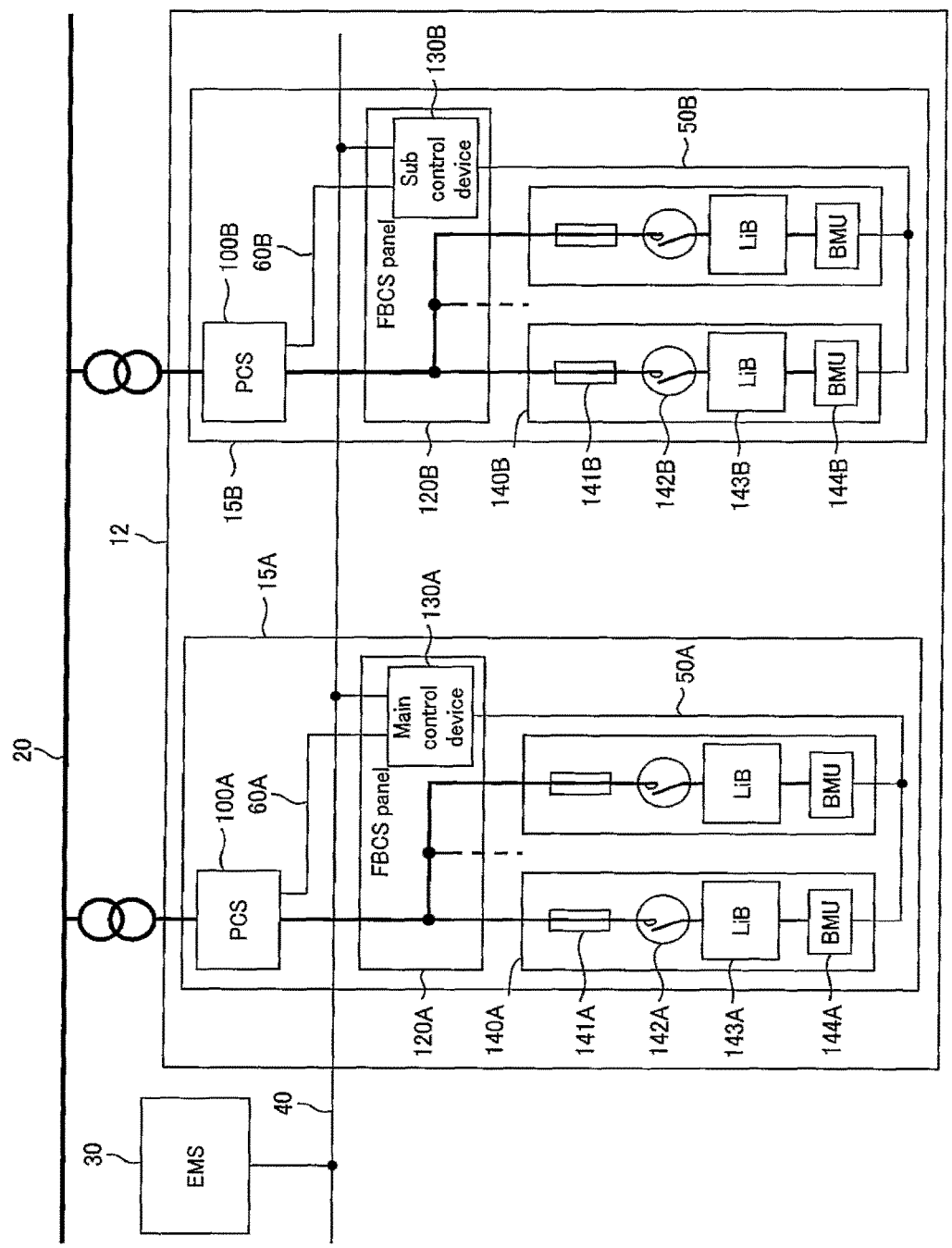
FIG. 5 is a conceptual block diagram for describing the configuration of a system according to a second embodiment of the present invention.

FIG. 5 is a conceptual block diagram for describing the configuration of a system according to a second embodiment of the present invention. The present embodiment is different from the first embodiment in the number of PCS groups included in the storage battery system. One PCS group includes one PCS, one FBCS panel connected to the PCS, and one or more storage battery panels. However, the control device placed on the FBCS panel is not a component member of the conceptual PCS group. The FBCS panel in the PCS group signifies a panel configured to connect a high-capacity power transmission line, which is connected with the power system via the PCS, and the power transmission lines extending from each of the storage battery panels. As the number of PCS groups included in a storage battery system becomes larger, the number of the storage battery modules increases, and therefore such a storage battery system with a large number of PCS groups can be said to have high capacity.

The storage battery system 12 of the present embodiment includes two PCS groups 15A and 15B. The first PCS group 15A includes a PCS 100A, an FBCS panel 120A, and a plurality of storage battery panels 140A. The second PCS group 15B includes a PCS 100B, an FBCS panel 120B, and a plurality of storage battery panels 140B. The configurations of the PCSs 100A and 100B, and the storage battery panels 140A and 140B are each identical to the configurations of the PCS 100 and the storage battery panel 140 in the first embodiment. Like the storage battery panel 140 in the first embodiment, the storage battery panels 140A and 140B include fuses 141A and 141B, contactors 142A and 142B, storage battery modules 143A and 143B, and BMUs 144A and 144B.

The storage battery system 12 of the present embodiment includes a main control device 130A and a sub-control device 130B. The main control device 130A is placed on the FBCS panel 120A, and the sub-control device 130B is placed on the FBCS panel 120B. In the present embodiment, the function of the control device 130 in the first embodiment is distributed into the main control device 130A and the sub-control device 130B. However, the main control device 130A plays the role of a commander that issues the charge/discharge command to each of the PCSs 100A and 100B, while the sub-control device 130B operates in conformity with an instruction from the main control device 130A.

For example, the main control device 130A and the sub-control device 130B each include memories including a ROM and a RAM, an input/output interface for inputting and outputting a variety of information, and a processor that can execute various arithmetic processes based on the variety of information. The main control device 130A and the sub-control device 130B are connected to the EMS 30 through a computer network 40 and are also connected to each other through the computer network 40. The main control device 130A is connected to the BMU 144A through a computer network 50A and to the PCS 100A through a computer network 60A. The main control device 130A is connected to the contactor 142A through a signal line. Meanwhile, the sub-control device 130B is connected to the BMU 144B through a computer network 50B and to the PCS 100B through a computer network 60B. The sub-control device 130B is also connected to the contactor 142B through the signal line.

[Characteristic Configuration of Second Embodiment]

Figure 6:
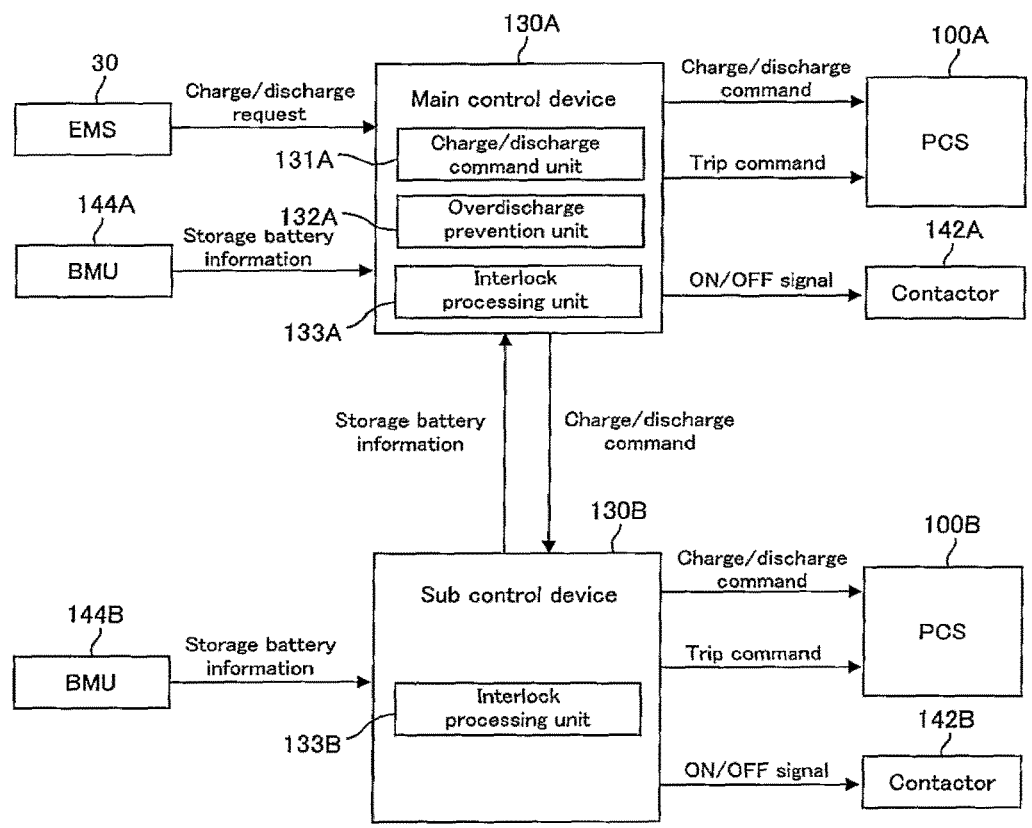
FIG. 6 is a block diagram of the system according to the second embodiment of the present invention.

FIG. 6 is a block diagram of the system according to the second embodiment of the present invention. In FIG. 6, a block representing the main control device 130A contains blocks representing some of various functions included in the main control device 130A. A block representing the sub-control device 130B contains blocks representing some of various functions included in the sub-control device 130B. Programs corresponding to the respective blocks are prepared for each of the main control device 130A and the sub-control device 130B, and these programs are executed by the processors, so that the functions of the respective blocks are implemented.

(Charge/Discharge Command Function)

The main control device 130A has a charge/discharge command function, which is implemented by a charge/discharge command unit 131A. The main control device 130A receives a charge/discharge request from the EMS 30, and receives storage battery information about the storage battery module 143A from the BMU 144A. The main control device 130A further receives storage battery information about the storage battery module 143B from the sub-control device 130B, the storage battery information being received from the BMU 144B by the sub-control device 130B. The charge/discharge command unit 131A determines a charge/discharge command to each of the PCSs 100A and 100B based on the charge/discharge request and the storage battery information. The charge/discharge command unit 131A then transmits the charge/discharge command to the PCS 100A and transmits to the sub-control device 130B the charge/discharge command to the PCS 100B.

The charge/discharge command unit 131A calculates chargeable/dischargeable electric power of the first PCS group 15A based on the voltage included in the storage battery information received from the BMU 144A. The charge/discharge command unit 131A also calculates chargeable/dischargeable electric power of the second PCS group 15B based on the voltage included in the storage battery information received from the sub-control device 130B. By using the calculated chargeable/dischargeable electric power of each of the PCS groups 15A and 15B as a constraint condition, the charge/discharge command unit 131A determines charge/discharge commands to the PCSs 100A and 100B so that the charge/discharge electric power of the entire PCS groups 15A and 15B meets the charge/discharge request from the EMS 30 as much as possible. For example, assume the case where the chargeable electric power in the first PCS group 15A is 40 kW, and the chargeable electric power in the second PCS group 15B is 60 kW. In this case, if a charge request of 100 kW is issued from the EMS 30, the charge/discharge command (charge command) to the PCS 100A is set to 40 kW, and the charge/discharge command (charge command) to the PCS 100B is set to 60 kW.

The charge/discharge command unit 131A calculates a SOC in each of the PCS groups 15A and 15B based on the respective voltages of the PCS groups 15A and 15B. The charge/discharge command unit 131A also adjusts the charge/discharge commands to each of the PCSs 100A and 100B so that the SOCs in the PCS groups 15A and 15B become uniform. For example, assume the case where a charge request of 80 kW is issued from the EMS 30 when the chargeable electric power in the first PCS group 15A is 40 kW and the chargeable electric power in the second PCS group 15B is 60 kW. In this case, the charge/discharge command unit 131A does not issue a charge command of 40 kW to each of the PCSs 100A and 100B but issues a charge/discharge command (charge command) of 30 kW to the PCS 100A and issues a charge/discharge command (charge command) of 50 kW to the PCS 100B for example. This makes it possible to approximate the SOCs of these two PCS groups 15A and 15B to each other. Thus, the charge/discharge command is determined for each of the PCSs 100A and 100B in accordance with the SOC of each of the PCS groups 15A and 15B. This makes it possible to maximize the performance of the storage battery while suppressing reduction in life of the storage battery.

As described in the foregoing, the charge/discharge command to each of the PCSs 100A and 100B is determined not in the sub-control device 130B but in the main control device 130A. The sub-control device 130B only receives the charge/discharge command transmitted from the main control device 130A and transmits the command to the PCS 100B. The chargeable/dischargeable electric power is also calculated not in the sub-control device 130B but in the main control device 130A. The sub-control device 130B only receives from the BMU 144B the storage battery information necessary for calculation of the chargeable/dischargeable electric power and transmits the information to the main control device 130A. However, the function corresponding to the charge/discharge command unit 131A is also included in the sub-control device 130B. When abnormality occurs and the charge/discharge command function of the main control device 130A fails, the main and sub devices are programmed to be switched, so that the sub-control device 130B implements the charge/discharge command function in place of the charge/discharge command unit 131A.

(Overdischarge Prevention Function)

The main control device 130A has an overdischarge prevention function, which is implemented by an overdischarge prevention unit 132A. The overdischarge prevention unit 132A detects that the storage battery in the first PCS group 15A is close to the overdischarging state based on the storage battery information transmitted from the BMU 144. The overdischarge prevention unit 132A also detects that the storage battery in the second PCS group 15B is close to the overdischarging state based on the storage battery information transmitted from the sub-control device 130B. When the overdischarge prevention unit 132A detects that the storage battery is close to the overdischarging state in the first PCS group 15A, it automatically outputs a charge command to the PCS 100A. When the overdischarge prevention unit 132A detects that the storage battery is close to the overdischarging state in the second PCS group 15B, it automatically outputs a charge command to the sub-control device 130B. The details of the overdischarge prevention function are in common with those in the first embodiment.

The sub-control device 130B receives the charge command transmitted from the main control device 130A and transmits the command to the PCS 100B. However, the function corresponding to the overdischarge prevention unit 132A is also included in the sub-control device 130B. When abnormality occurs and the overdischarge prevention function of the main control device 130A fails, the main and sub devices are programmed to be switched, so that the sub-control device 130B implements the overdischarge prevention function in place of the overdischarge prevention unit 132A.

(Interlock Function)

The main control device 130A has an interlock function, which is implemented by an interlock processing unit 133A. The sub-control device 130B also has an interlock function, which is implemented by an interlock processing unit 133B. When abnormality of the first PCS group 15A is detected, the interlock processing unit 133A outputs to the PCS 100A a trip command and/or turns off the contactor 142A in accordance with the content of the detected abnormality. When abnormality of the second PCS group 15B is detected, the interlock processing unit 133B outputs to the PCS 100B a trip command and/or turns off the contactor 142B in accordance with the content of the detected abnormality. The details of the software interlock by each of the interlock processing units 133A and 133B are in common with those in the first embodiment.

(Flow Chart)

Figure 7:
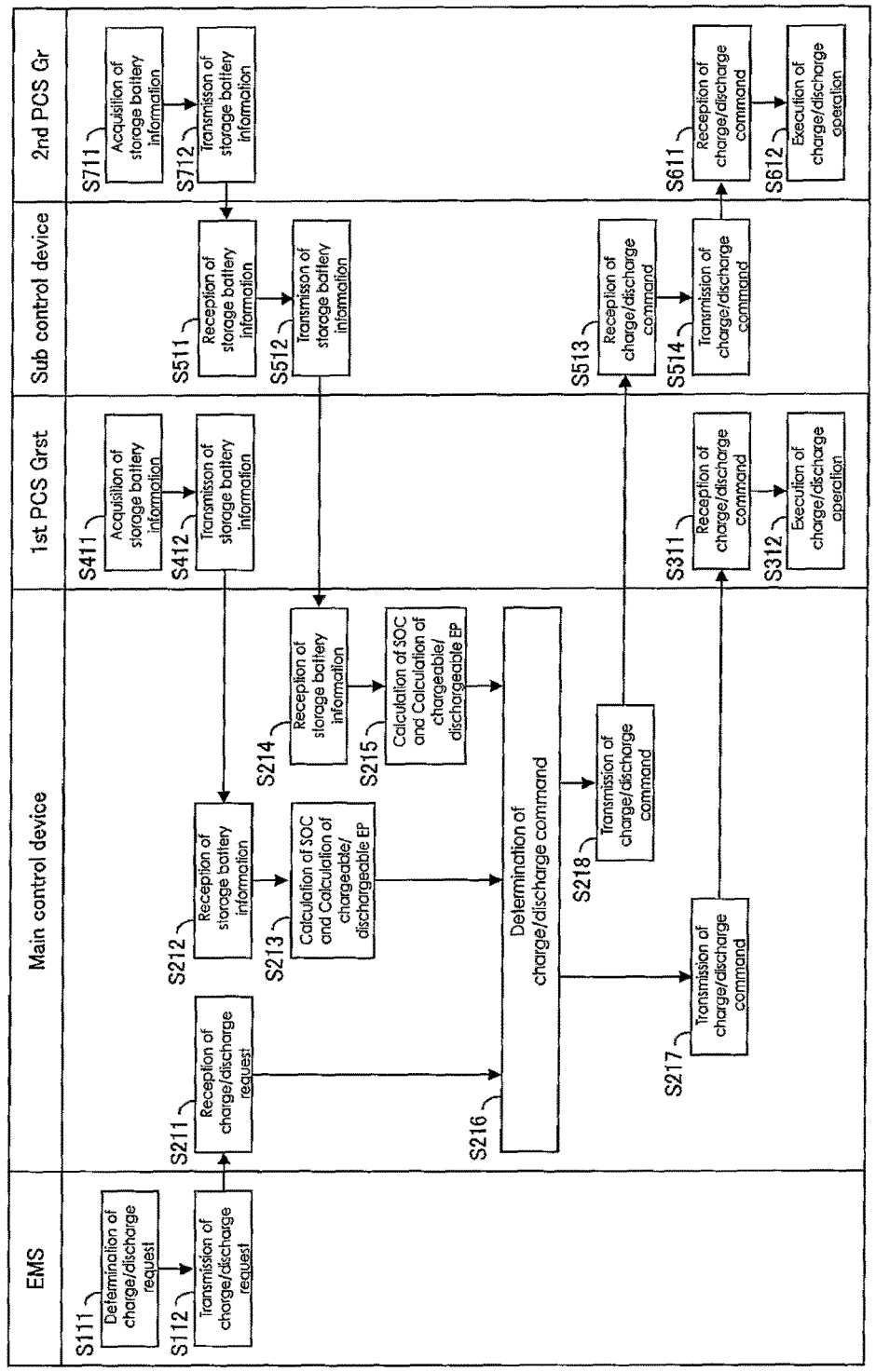
FIG. 7 is a flow chart of a control routine executed by the storage battery system in the second embodiment of the present invention.

FIG. 7 is a flow chart of a control routine executed by the storage battery system 12 to implement charge/discharge control based on the charge/discharge request from the EMS 30. Processing of the main control device 130A illustrated in this flow chart is implemented by the function of the charge/discharge command unit 131A. The memory of the main control device 130A stores programs for executing the processing of the flow chart illustrated in FIG. 7. The processor of the main control device 130A reads and executes the programs to implement the processing illustrated in FIG. 7.

In the routine illustrated in FIG. 7, the EMS 30 first determines a charge/discharge request to the storage battery system 12 so as to balance electric power demand and supply in the power system (step S111). The EMS 30 transmits the determined charge/discharge request to the main control device 130A (step S112).

In the first PCS group 15A, the BMU 144A acquires storage battery information on the constant basis by using various sensors (step S411). The storage battery information includes current passing through the storage battery module 143A, voltage of each cell, and temperature of the storage battery module 143A. Then, the BMU 144A transmits the acquired storage battery information to the main control device 130A (step S412).

In the second PCS group 15B, the BMU 144B acquires storage battery information on the constant basis by using various sensors (step S711). The storage battery information includes current passing through the storage battery module 143B, voltage of each cell, and temperature of the storage battery module 143B. Then, the BMU 144B transmits the acquired storage battery information to the sub-control device 130B (step S712).

The sub-control device 130B receives the storage battery information transmitted from the BMU 144B (step S511). Then, the sub-control device 130B transmits the received storage battery information to the main control device 130A (step S512).

The main control device 130A receives the charge/discharge request transmitted from the EMS 30 (step S211). The main control device 130A also receives the storage battery information transmitted from the BMU 144A in the first PCS group 15A (step S212). The main control device 130A calculates chargeable/dischargeable electric power of the first PCS group 15A based on the storage battery information received in step S212 (step S213). The chargeable/dischargeable electric power is re-calculated in the main control device 130A, whenever the storage battery information is acquired in step S411 and is transmitted from the BMU 144A to the main control device 130A. The main control device 130A further receives the storage battery information transmitted from the sub-control device 130B (step S214). The main control device 130A calculates chargeable/dischargeable electric power of the second PCS group 15B based on the storage battery information received in step S214 (step S215). The chargeable/dischargeable electric power is re-calculated in the main control device 130A, whenever the storage battery information is acquired in step S711 and is transmitted from the sub-control device 130B to the main control device 130A.

By using each of the chargeable/dischargeable electric power calculated in step S213 and the chargeable/dischargeable electric power calculated in step S215 as a constraint condition, the main control device 130A determines the charge/discharge commands to the PCSs 100A and 100B based on the charge/discharge request received in step S211 (step S216). The method for determining the charge/discharge commands to be executed in step S216 is as stated in the description of the charge/discharge command function. Then, the main control device 130A transmits to the PCS 100A the charge/discharge command to the PCS 100A (step S217). The main control device 130A also transmits to the sub-control device 130B the charge/discharge command to the PCS 100B (step S218).

The sub-control device 130B receives the charge/discharge command transmitted from the main control device 130A (step S513). Then, the sub-control device 130B transmits the received charge/discharge command to the PCS 100B (step S514).

In the first PCS group 15A, the PCS 100A receives the charge/discharge command transmitted from the main control device 130A (step S311). The PCS 100A executes charge/discharge operation in accordance with the charge/discharge command (step S312).

In the second PCS group 15B, the PCS 100B receives the charge/discharge command transmitted from the sub-control device 130B (step S611). The PCS 100B executes charge/discharge operation in accordance with the charge/discharge command (step S612).

As described in the foregoing, the storage battery system 12 of the present embodiment operates each of the PCSs 100A and 100B not as directed by the charge/discharge request determined by the EMS 30 but in accordance with the charge/discharge command determined by the main control device 130A. In determination of the charge/discharge commands by the main control device 130A, the charge/discharge commands to the PCSs 100A and 100B are determined for each of the PCS groups 15A and 15B so that the entire charge/discharge electric power of the PCS groups 15A and 15B meets the charge/discharge request and the SOCs of the PCS groups 15A and 15B become uniform. Therefore, the storage battery system 12 in the present embodiment can maximize the performance of the storage battery constituting each of the PCS groups 15A and 15B without causing overuse of the storage battery.

Others

The present invention is not limited to the embodiments disclosed, but various modifications are possible without departing from the scope of the present invention. For example, the number of the PCS groups may be increased in the second embodiment. The added PCS groups may include a sub-control device having the same function as the sub-control device 130B.

Although the control devices 130, 130A and 130B are placed on the FBCS panels 120, 120A and 120B in the system of the embodiments described in the foregoing, the placement position of the control devices 130, 130A and 130B are not limited thereto. For example, the control devices 130, 130A and 130B may be placed in the PCSs 100, 100A and 100B, the storage battery panels 140, 140A and 140B, or in any one of the BMUs 144, 144A, 144B. Moreover, various functions mounted on the control devices 130, 130A and 130B may be mounted on the PCSs 100, 100A and 100B, and be installed in the PCSs 100, 100A and 100B. These various functions may also be installed in the storage battery panels 140, 140A and 140B and in the BMUs 144, 144A and 144B.

REFERENCE SIGNS LIST 10, 12 Storage battery system
15A, 15B PCS group
20 Power transmission facility
30 Energy management system (EMS)
40, 50, 50A, 50B, 60, 60A, 60B Computer network
100, 100A, 100B Power conditioning system (PCS)
120, 120A, 120B FBCS panel
130 Control device
130A main control device
130B sub-control device
131, 131A Charge/discharge command unit
132, 132A Overdischarge prevention unit
133, 133A, 133B Interlock processing unit
140, 140A, 140B Storage battery panel
141, 141A, 141B Fuse
142, 142A, 142B Contactor
143, 143A, 143B Storage battery module
144, 144A, 144B Battery management unit (BMU)

The invention claimed is:

1. A storage battery system connected to a power system and operative based on a charge/discharge request from an energy management system that manages electric power supply/demand of the power system, the storage battery system comprising:
   a plurality of storage battery modules connected in parallel;
   a plurality of storage battery management units that are provided to each of the plurality of storage battery modules and are configured to monitor charge states of the plurality of storage battery modules;
   a power conditioning system having a function of converting AC power of the power system into DC power and charging the plurality of storage battery modules with the DC power and a function of converting DC power of the plurality of storage battery modules into AC power and discharging the AC power to the power system; and
   a control device configured to receive the charge/discharge request and storage battery information including cell voltage information supplied from the plurality of storage battery management units and to control the power conditioning system based on the charge/discharge request and the storage battery information including the cell voltage information, wherein
   the control device includes a charge/discharge command unit configured to calculate chargeable/dischargeable electric power based on the storage battery information including the cell voltage information and to determine a charge/discharge command to the power conditioning system based on the charge/discharge request by using the chargeable/dischargeable electric power as a constraint condition.

2. The storage battery system according to claim 1, wherein
   the control device further includes an interlock processing unit configured to perform interlock processing upon detection of abnormality of the storage battery system, the interlock processing corresponding to a content of the detected abnormality.

3. The storage battery system according to claim 2, wherein
   the interlock processing unit is configured to detect abnormality of the storage battery system based on the storage battery information.

4. The storage battery system according to claim 1, wherein
   the charge/discharge command unit is configured to calculate the chargeable/dischargeable electric power based on the voltage of the storage battery.

5. The storage battery system according to claim 1, wherein
   the storage battery includes a plurality of storage battery modules connected in parallel, each of the plurality of storage battery modules including a plurality of storage battery cells connected in series, and
   the charge/discharge command unit is configured to calculate the chargeable/dischargeable electric power based on the voltage of the storage battery and the number of the storage battery modules connected in parallel.

6. The storage battery system according to claim 1, wherein
   the charge/discharge command unit is configured to determine the charge/discharge command so as to maximize charge/discharge electric power of the storage battery.

7. The storage battery system according to claim 1, wherein one PCS group includes one power conditioning system, one or more storage batteries, and one or more battery management units, one control device is assigned to the plurality of PCS groups, and the charge/discharge command unit is configured to determine the charge/discharge command for each of the PCS groups in accordance with the chargeable/dischargeable electric power calculated for each of the PCS groups.

8. The storage battery system according to claim 7, wherein the charge/discharge command unit is configured to adjust the charge/discharge command among the plurality of PCS groups so that charge/discharge electric power of the entire plurality of PCS groups meets the charge/discharge request.

9. The storage battery system according to claim 7, wherein the charge/discharge command unit is configured to calculate a SOC for each of the PCS groups and to determine the charge/discharge command for each of the PCS groups so that the SOCs of the PCS groups become uniform.

10. The storage battery system according to claim 1, wherein the control device further includes an overdischarge prevention unit configured to automatically output a charge command to the power conditioning system regardless of the charge/discharge request to prevent the storage battery from reaching an overdischarging state, when the storage battery is close to the overdischarging state.

11. The storage battery system according to claim 10, wherein the overdischarge prevention unit is configured to compare the voltage of the storage battery with a specified lower limit voltage and to detect that the storage battery is close to the overdischarging state when the voltage of the storage battery is equal to or below the lower limit voltage.

12. The storage battery system according to claim 10, wherein the storage battery includes a plurality of storage battery modules connected in parallel, each of the plurality of storage battery modules including a plurality of storage battery cells connected in series, and the overdischarge prevention unit is configured to compare a voltage of each of the storage battery cells with a specified lower limit cell voltage and to detect that the storage battery is close to the overdischarging state when the voltage of any one of the storage battery cells is equal to or below the lower limit cell voltage.

* * * * *